(12) United States Patent
Quint (10) Patent No.: US 7,136,156 B1
(45) Date of Patent: Nov. 14, 2006

(54) OPTICAL TIME DOMAIN REFLECTOMETER (OTDR) DATA STORAGE AND RETRIEVAL

(75) Inventor: Joe Quint, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 311 days.

(21) Appl. No.: 10/601,791

(22) Filed: Jun. 23, 2003

(51) Int. Cl.
*G01N 21/00* (2006.01)

(52) U.S. Cl. ..................................... 356/73.1

(58) Field of Classification Search ............... 356/73.1; 714/57, 45, 39; 707/102, 200, 205; 717/169
See application file for complete search history.

(56) References Cited

U.S. PATENT DOCUMENTS

2004/0006726 A1 * 1/2004 Adam et al. ................... 714/57

OTHER PUBLICATIONS

Remote Fiber Testing for Full Service, Emerging and Next Generation Networks, QuestFiber, NETTEST, Website, www.nettest.com, Utica, NY (6 sheets/12 pages).

Acterna Atlas, Remote Fiber Test System, ACTERNA, Germantown, Maryland (6 sheets/12 pages).
Agilent acesssFIBER, Network Planning, Agilent Technologies, Website, www.agilent.com. (2 sheets/3 pages).
Agilent accessFIBER, Network Operations, Agilent Technologies, Website. www.agilent.com. (2 sheets/3 pages).
Agilent accessFIBER, Network Assurance, Agilent Technologies, Website, www.agilent.com, (2 sheets/3 pages).
Agilent accessFIBER, Optical Network Management Solutions, Agilent Technologies. Website, ww.agilent.com, (7 sheets/13 pages).

* cited by examiner

*Primary Examiner*—Tu T. Nguyen (57) ABSTRACT

A method, system, and medium are provided for Optical Time Domain Reflectometer (OTDR) Data storage and retrieval in a networking environment. The method includes receiving an OTDR trace file in its native format that includes OTDR information, storing the trace file, receiving a request to present the OTDR information in a browser or some other interface, identifying a viewer that can render the OTDR information, and communicating the OTDR information to the browser. The system includes a user interface that facilitates uploading an OTDR trace file in its native format, a storage device for receiving the trace file, and a viewer that can render the data within the OTDR trace file.

31 Claims, 10 Drawing Sheets

OPTICAL TIME DOMAIN REFLECTOMETER (OTDR) DATA STORAGE AND RETRIEVAL

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the fields of data storage and retrieval. More particularly, it relates to logging and retrieving optical-time-domain-reflectometer files and related data in a communications networking environment.

BACKGROUND OF THE INVENTION

Fiber-optic cables are common in a telecommunications network. Light reflects within the cable to transmit data. If the light is not reflecting properly, data-transmissions may be adversely affected. An Optical Time Domain Reflectometer (OTDR) device can be used to troubleshoot a communications link such as a fiber-optic cable. The OTDR measures the elapsed time and intensity of light reflected on an optical fiber. The reflectometer can—by itself or in connection with other tools—compute the distance to problems on the fiber. Exemplary problems include excessive attenuation and line breaks.

An OTDR device generates OTDR data. The OTDR device is applied to a desired communications link to produce a trace file. This trace file contains data relating to the optical fiber's performance. The format of the trace file varies across OTDR manufacturers. File formats are typically designated by an extension. By way of comparative example, a .TXT file—a file having a .TXT extension—is a text file and a .DOC file is a word-processing file natively associated with MS WORD® offered by Microsoft Corporation of Redmond, Wash. A first native OTDR file format is SOR and is associated with Telcordia Technologies, Inc. of Morristown, N.J. Alternative native OTDR file formats include .WFM and .CFF, which are associated with devices made by Tektronix, Inc. of Beaverton, Oreg. as well as .PSF, which are associated with devices made by Photon Kinetics, Inc of Beaverton, Oreg.

Telecommunications carriers need access to the data stored inside these native files. But carriers typically use proprietary databases that need to be populated with the data in the OTDR trace files. Historically, a company develops filtering devices and converters to extract the data from native trace files and to store the data in a database for future retrieval. Each time a trace-file format changes, however, a new converter must be developed if the original cannot be adapted. Moreover, if an entirely new trace-file format is to be used, a custom filter and/or converter must be coded. If a company uses OTDR devices provided by multiple vendors, then multiple filters and converters must be developed and implemented. This vendor-specific implementation is constraining, lacks scalability, and hinders technological advances.

For any number of reasons, a carrier may wish to use OTDR devices produced by different vendors: some products are higher quality, some are less expensive, etc. Enabling a carrier or any entity to be able to store, retrieve, and manipulate data in an OTDR-device-independent environment is desirable. The current state of the art can be improved upon by providing a method and system that eliminates the need for custom data extraction by at least allowing native OTDR trace files to be stored in their native format while maintaining the ability to subsequently view data stored within the trace files.

SUMMARY OF THE INVENTION

The present invention solves at least the above problems by providing a system and method that allows OTDR trace files to be stored in their native format and viewing of data within those files though a ubiquitous interface, such as via the Internet. The present invention has several practical applications in the technical arts including storing and organizing OTDR trace files in their native format instead of having to first extract data and then store that data. Proprietary filters and converters would no longer be necessary, nor would the other various software products that historically have been used to store the OTDR data in a proprietary format.

The present invention provides a method and system for storing and viewing OTDR data. Instead of divorcing data within an OTDR file from the file and then storing that data, the present invention stores OTDR trace files in their native format. The trace files are organized and stored according to a prescribed standardization. The trace files are made available for presentation via the Internet.

An exemplary method includes receiving an OTDR trace file in its native format. As mentioned above, the OTDR trace file includes OTDR information. The OTDR trace file is stored in one or more computer-readable media. When a request to present the OTDR information is received by way of a browser, a viewer is identified that can render the OTDR information. The present invention then communicates the OTDR information to the browser or other user interface.

BRIEF DESCRIPTION OF THE SEVERAL VIEWS OF THE DRAWINGS

The present invention is described in detail below with reference to the attached drawing figures, wherein:

FIGS. 1B–1H depict selected screenshots that illustrate various functional aspects of the present invention;

DETAILED DESCRIPTION OF THE INVENTION

The present invention provides a method and system for storing and retrieving Optical Time Domain Reflectometer (OTDR) data. This allows OTDR data to be stored in its native format. The trace files can then be selected and viewed through a web interface from any device with access to the web.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

DMS Document Management System
OTDR Optical Time Domain Reflectometer
.SOR Telcordia OTDR trace-file type
.PSF Photon Kinetics OTDR trace-file type
.WFM Tektronix OTDR trace-file type
.CFF Tektronix OTDR trace-file type Further, various technical terms are used throughout this description. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed the meaning of the words offered in the above-cited reference. For example, whereas some distinguish the World Wide Web (WWW) as a subcomponent of the Internet, "web"—as used herein—should not be construed as limited to the WWW. Rather, "web" is intended to refer generally to the Internet and/or is related subnetworks and subcomponents.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on a computer-readable medium.

Computer-readable media include both volatile and nonvolatile media, removable and nonremovable media, and contemplates media readable by a database, a switch, and various other network devices. Network switches, routers, and related components are conventional in nature, as are the means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1A:
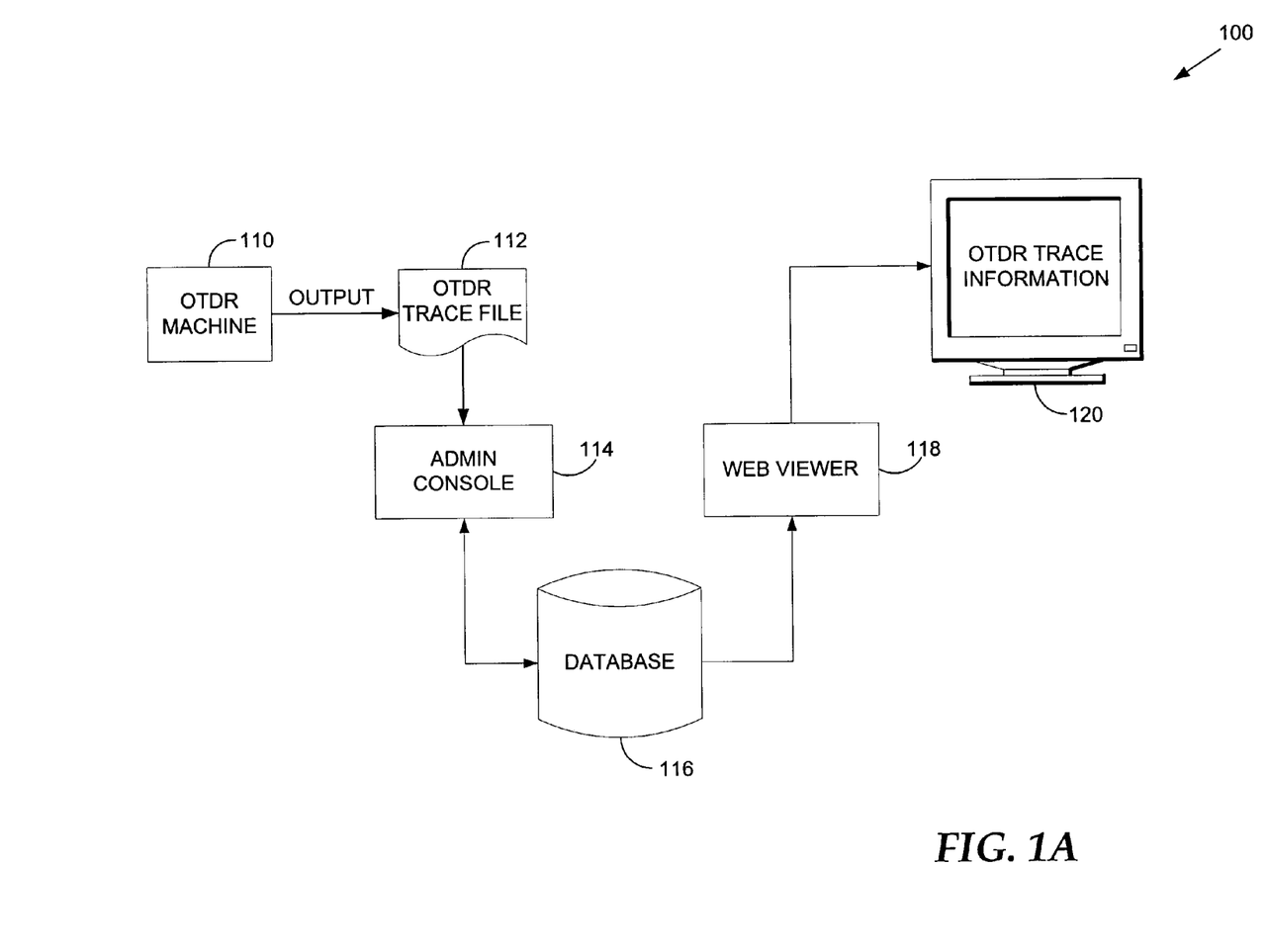
FIG. 1A is a block diagram depicting a first embodiment of the present invention.

As previously mentioned, the present invention is, among other things, a computer-program product that enables the storing and retrieval of OTDR trace data. FIG. 1A depicts a block diagram of an exemplary embodiment of the present invention. Not all of the components shown are necessary components but are depicted to help better explain the invention. An OTDR device 110 outputs an OTDR trace file 112. An administrative console (admin console) 114 is in connection with a database 116 that is in turn coupled to a web viewer 118 that displays images on a display device 120.

OTDR device 110 can be any device used in connection with generating OTDR data. Optical-time-domain reflectometry involves measuring the elapsed time and intensity of light reflected through an optical fiber. The reflectometer aids in determining the distance to problems on the fiber. Exemplary problems include unacceptable signal attenuation and line breaks. Any sort of troubleshooting device used to diagnose fiber problems may be an OTDR device.

Exemplary OTDR devices include the CMA line of products (models 40, 4000i, 5000, 8800, etc.) offered by NetTest of Copenhagen, Denmark; the OPTIFIBER™ Certifying OTDR product offered by Fluke Networks of Everett, Wash.; or the Agilent OTDR Toolkit (such as E6092A) offered by Agilent Technologies, Inc. of Palo Alto, Calif. Those skilled in the relevant art will readily appreciate that the aforementioned list is not exhaustive and that there are tens or even hundreds of manufacturers and even more devices to be used in connection with isolating fiber-optic faults and problems, all of which are contemplated within the scope of the present invention and may be an OTDR device.

OTDR trace file 112 is a file or datastream produced by OTDR device 110. Typically, the OTDR trace file 112 includes OTDR data. Exemplary OTDR data includes fiber counts; analysis of splices, connectors and fiber attenuation; bidirectional measurement analysis data such as two-way-averaging and bending detection measurements; scan trace and pass/fail test data; multiple traces; refractive indices; back-scatter coefficients; and/or resplicing and repair data. This data, and more as one skilled in the art would appreciate, is outputted to trace file 112.

The OTDR trace file 112 may assume a variety of formats based on manufacturer or standards. An exemplary trace format is Bellcore/Telcordia compliant according to the GR-196 or SR-4731 data standard. As previously mentioned, trace-file formats can be indicated by file extensions. Exemplary extensions include .SOR, .PSF, .WFM, and .CFF. Many more file formats exist, all of which are contemplated within the scope of the claims below.

Admin console 114 provides an interface to upload an OTDR trace to a storage component such as database 116. Admin console 114 provides a navigational facility to retrieve the OTDR traces and manages the aforementioned data including routes, fibers, spans, and power-measurement data. Admin console 114 is a computer-program product that provides a gateway for administrating the OTDR data. A portion of the screen interfaces that compose admin console will be elaborated on with respect to FIGS. 1B–1H before returning to FIG. 1A.

Figure 1B:
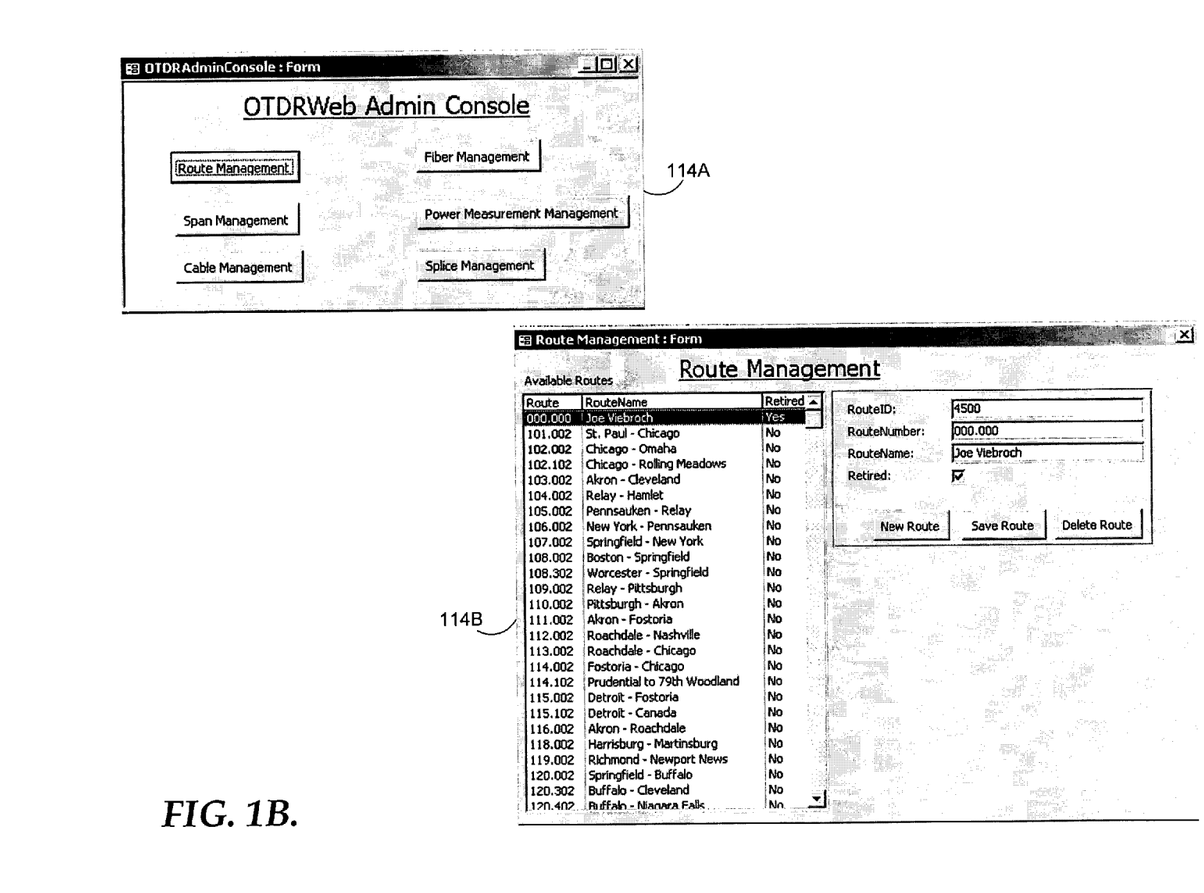
Figure 1C:
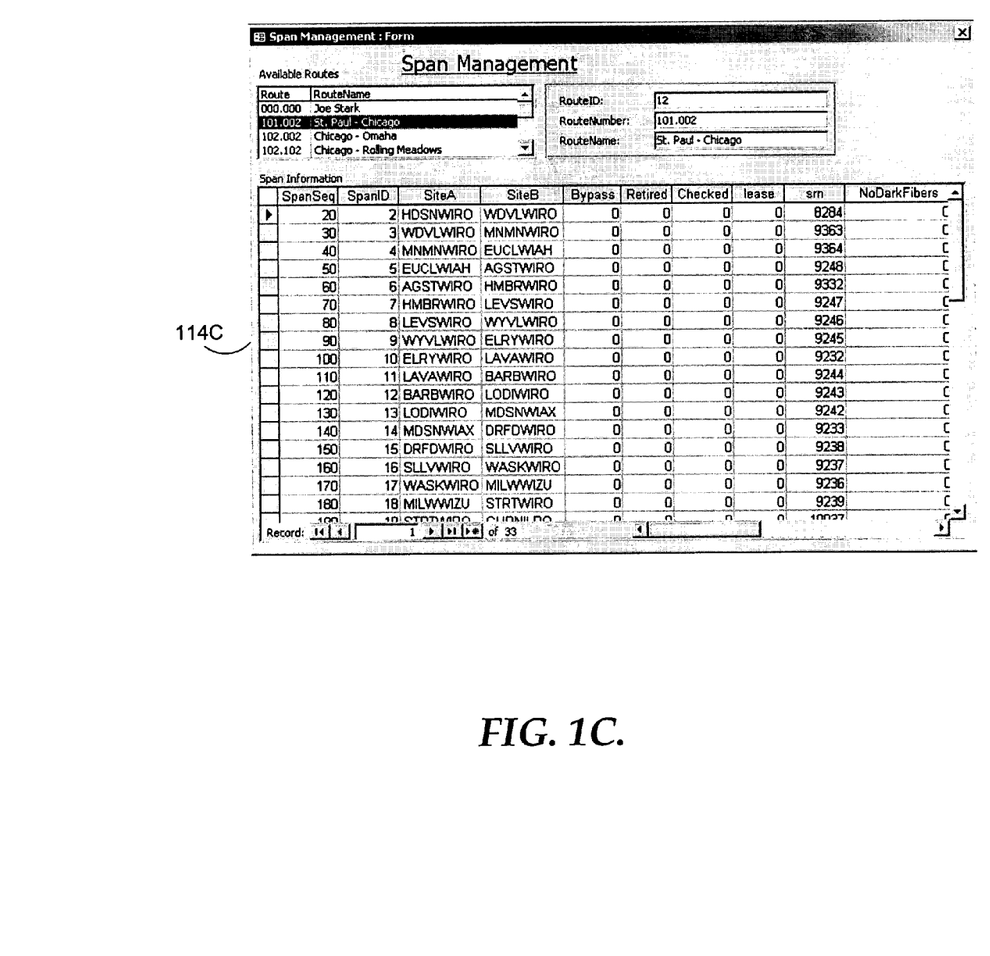
Figure 1D:
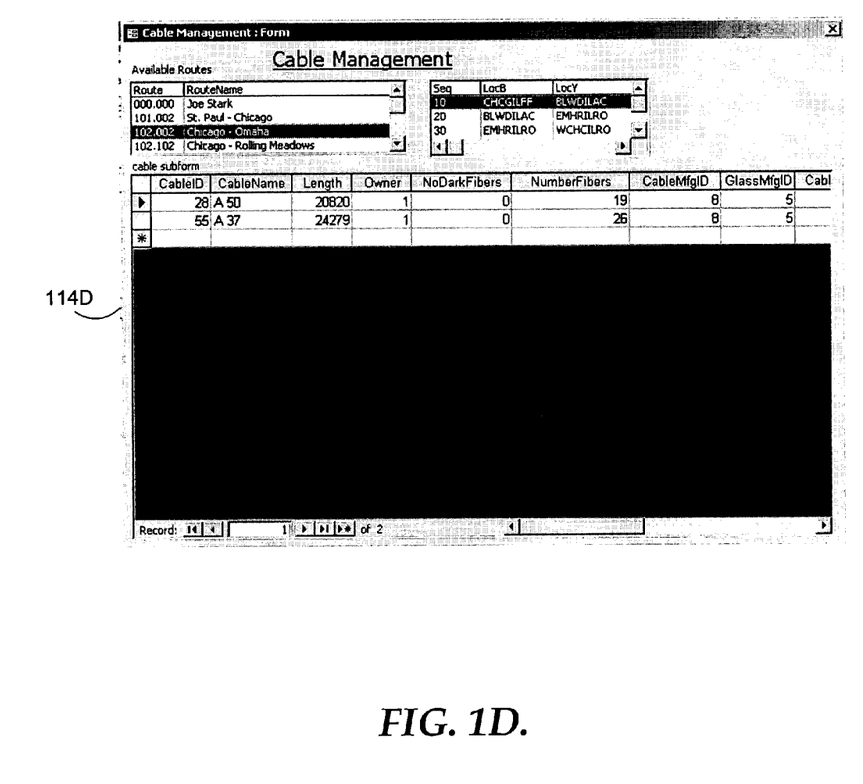
Figure 1G:
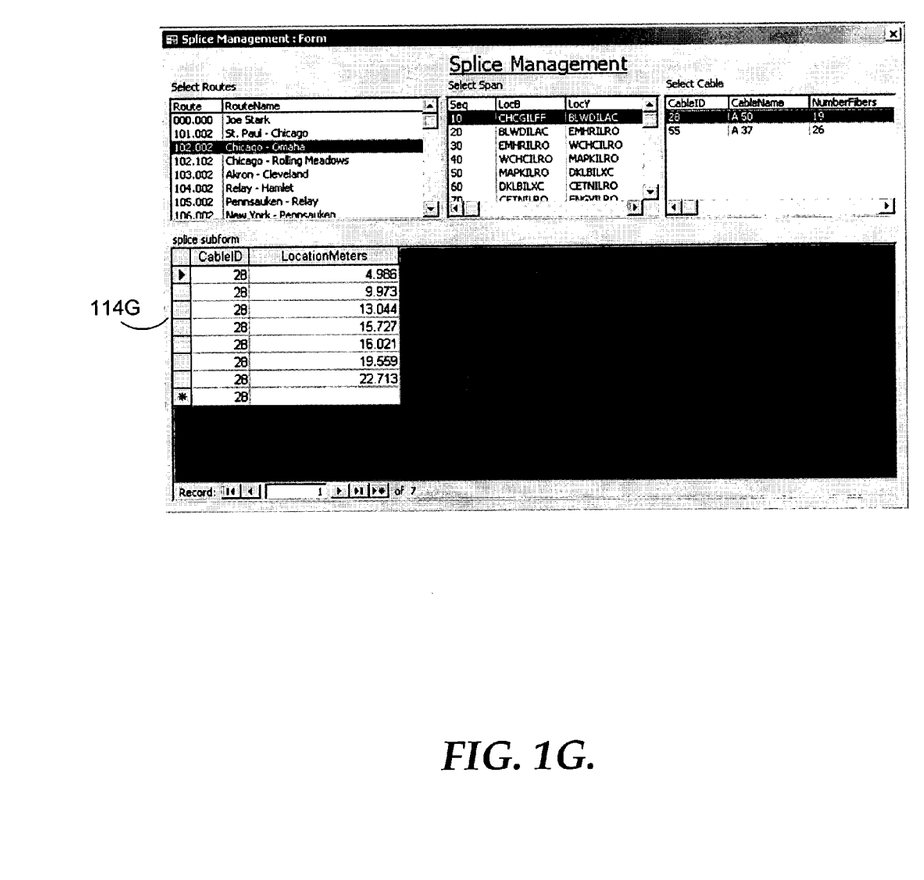
Figure 1H:
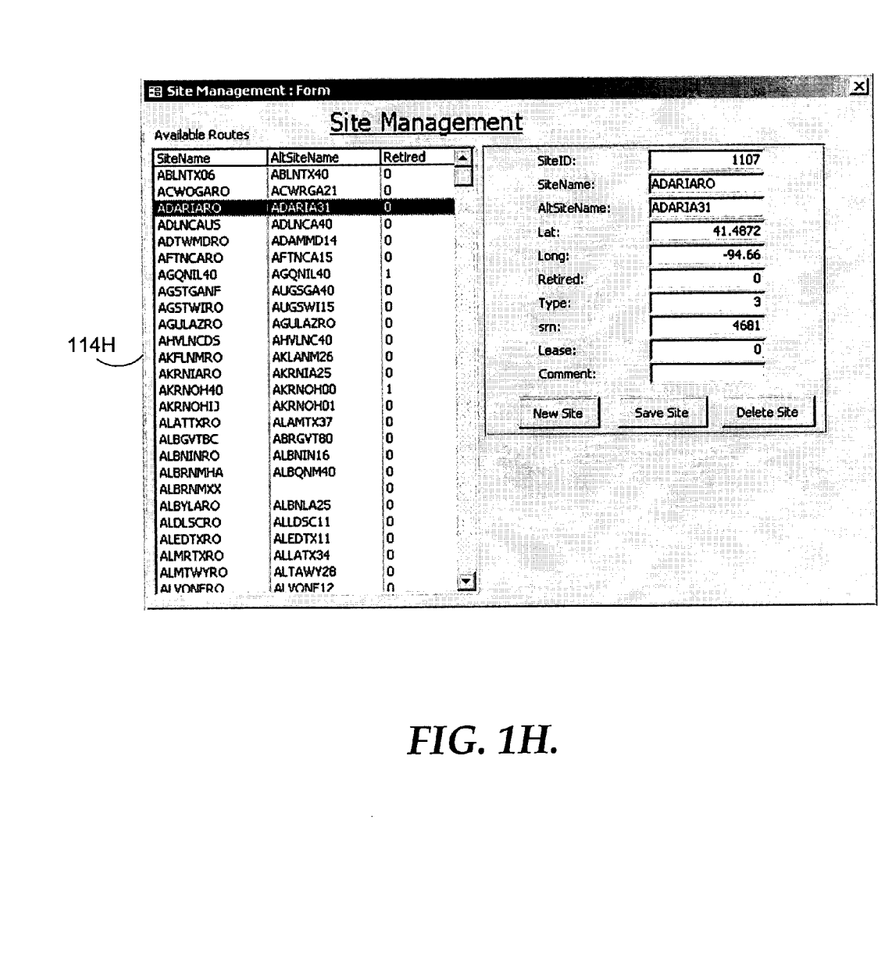

FIG. 1B depicts an exemplary screenshot that provides functionality to allow a user to navigate to various management screens that can edit the data found in database 116 and is referenced by numeral 114A. In one embodiment, screen 114A includes links to a route-management interface 114B, a span-management interface 114C, a cable-management interface 114D, a fiber-management interface 114E, a power-measurement-management interface 114F, and a splice-management interface 114G. Other links could also be provided. The links included are intended to illustrate the functional aspect of being able to navigate to other desired interfaces.

Route-management interface 114B provides a mechanism for administrating the OTDR data. This interface 114B allows a user to view routes in the database 116. As shown, available routes are listed by route number and route name along with an indication as to whether the route is retired. Routes can be modified, created, and deleted via route-management interface 114B.

Span-management interface 114C (FIG. 1C) allows a user to select from a list of available routes and view all of the spans in the database 116. As shown, a route can be selected from a list, whereby additional route information is displayed. Exemplary additional route information includes a span-sequence identifier, a span ID, a first site, a second site, a bypass indicator, a retired indicator, a checked indicator, a leased indicator, and the like. Spans can be modified, created, and deleted via span-management interface 114C.

Cable-management interface 114D (FIG. 1D) enables a user to select from a list of available routes and spans to view all of the cables for a particular route/span. As shown, information such as a cable identifier, a cable name, a cable length, an owner indicator, a dark-finders indicator, a number of fibers associated with a cable, etc. One skilled in the art would appreciate additional functionality from FIG. 1D as well as all of the FIGs. Cables can be modified, created, and deleted from cable-management interface 114D.

Fiber-management interface 114E (FIG. 1E) enables a user to select from a list of available routes, spans, and cables to view fibers for that route/span/cable. As shown, routes can be selected by a route number and/or route name. Further, a span can be chosen and then a specific cable whereby additional data can then be displayed. Fibers can be modified, created, and deleted via fiber-management interface 114E.

Power-measurement-management interface 114F (FIG. 1F) allows a user to select from a list of available routes, spans, cables, and fibers to view power measurements for that route/span/cable/fiber. As shown, a route, span, and cable can be selected to then display power-measurement data. Exemplary power-measurement data includes a cable identifier, an end identifier, a direction marker, a power reading, a correction value, a wavelength, and a test date. Power measurements can be modified, created, and deleted via power-measurement-management interface 114F.

Splice-management interface 114G (FIG. 1G) allows a user to select from a list of available routes, spans, cables, and fibers to view splices for a given route/span/cable/fiber. Slice points can be modified, created, and deleted via splice-management interface 114G. Also, a site-management interface 114H (FIG. 1H) is provided to list the information shown that is related to a selected site.

Returning to FIG. 1A, web viewer 118 is used to present the data of native trace file 112. In a preferred embodiment, web viewer 118 is a browser plug-in. A plug-in is a program component that enhances, or adds to, the operation of a parent program. Plug-ins are used in web browsers to add functionality. Here, a plug-in is used to create a viewer that will allow the data in trace file 112 to be presented on display device 120.

Figure 2:
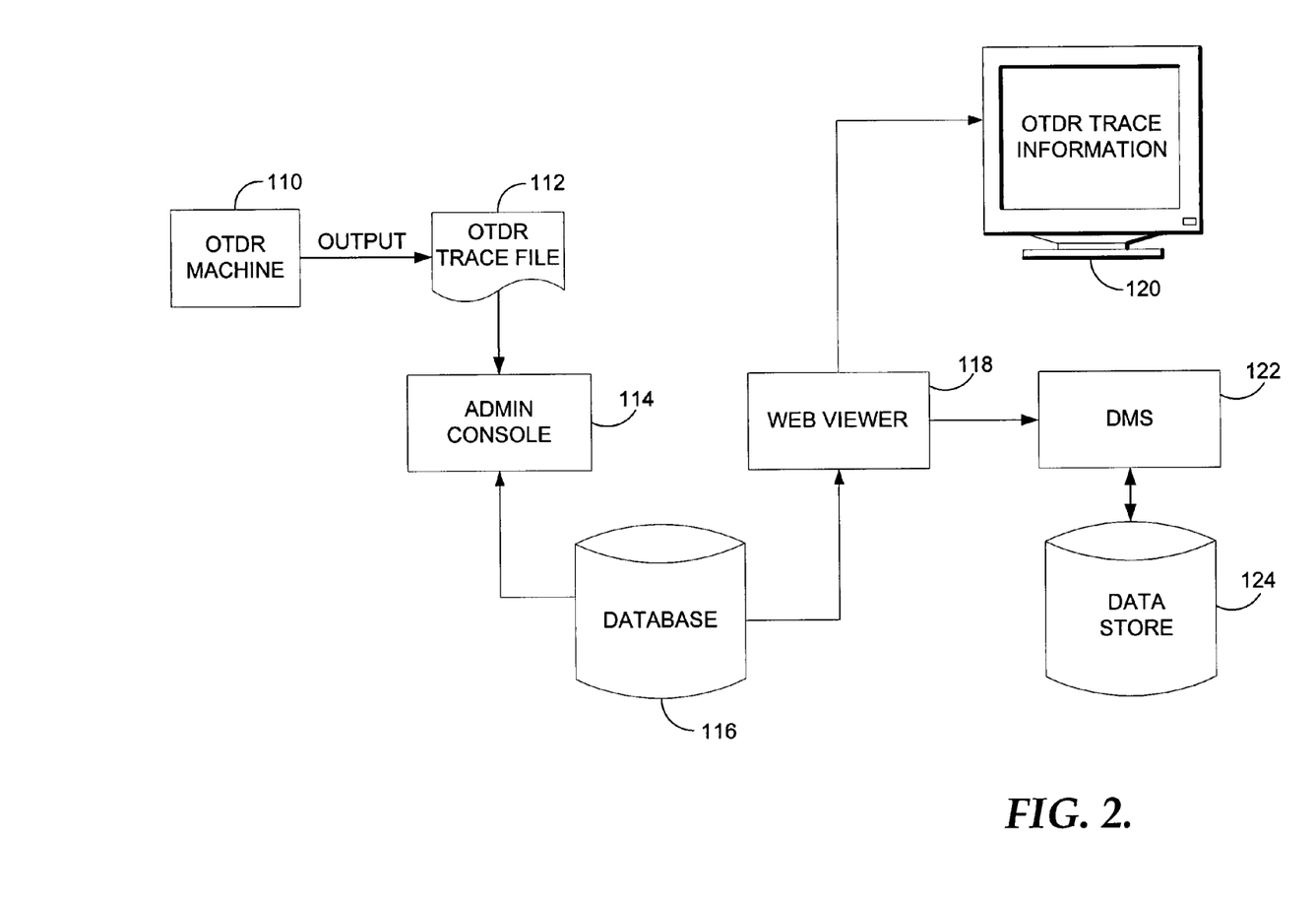
FIG. 2 is a block diagram depicting a second embodiment of the present invention.

FIG. 2 depicts an alternative embodiment of the present invention that includes a Document Management System (DMS) 122 and a data store 124. In this embodiment, trace files can be stored in data store 124 using a conventional DMS 122.

Figure 3:
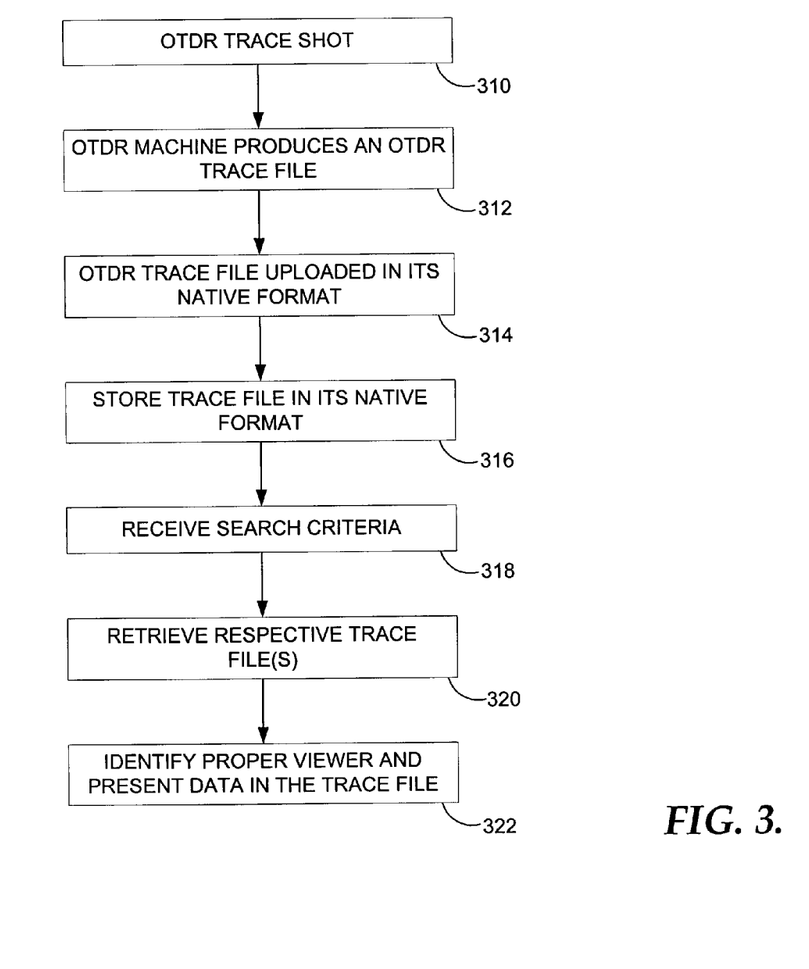
FIG. 3 is a flowchart depicting an illustrative embodiment of the present invention.

FIG. 3 depicts an illustrative process for practicing the present invention. Not all steps are necessary. Some steps are included to better illustrate the present invention. For example, at a step 310, an OTDR trace file is generated by any number of ways but is not a required step. An OTDR device is used to generate a trace file, such as trace file 112. The trace file 112 is uploaded to a storage component in its native format at a step 314. The file is organized subject to a standardization imposed by the user. But the trace file can be stored in its native format at a step 316. Thus, there is no need for conversion or filtering devices to store the data within trace file 112. The file can be stored in its native format.

At a step 318, search criteria may be received regarding trace data of interest. Incident to receiving the search criteria, the present invention retrieves the respective trace file(s) at a step 320. This allows a proper viewer to be identified whereby the data in said trace file can be presented on display device 120. Display device 120 can be any device (monitor, flat screen, LCD, TFT, hand-held device, etc.) adapted to render data for viewing.

As can be seen, the present invention and its equivalents are well-adapted to provide a new and useful method for, among other things, storing and retrieving OTDR data. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need to be carried out in the specific order described.

The invention claimed is:

1. A method for accessing Optical Time Domain Reflectometer (OTDR) trace information generated by an OTDR device, comprising:
   receiving an OTDR trace file in its native format, wherein the OTDR trace file includes OTDR information;
   storing the OTDR trace file on one or more computer-readable media;
   receiving a request to present the OTDR information in a browser;
   identifying a viewer that can render the OTDR information in the browser; and
   using the viewer and the OTDR trace file in its native format, presenting the OTDR information via the browser on a display device.

2. The method of claim 1, wherein the OTDR information includes data related to diagnosing communications problems associated with an optical-transmission route.

3. The method of claim 2, wherein the data includes information related to a fiber route, fiber span, and/or fiber cable.

4. The method of claim 2, wherein storing the OTDR trace file includes storing the trace file in its native format.

5. The method of claim 4, wherein the native format includes a file format having at least one of the following extensions: .SOR, .PSE, .WFM, and .CFF.

6. The method of claim 4, wherein the browser includes a computer-program product that translates digital bits into viewable data objects pursuant to a prescribed protocol, wherein the prescribed protocol includes one or more of the following: a variant of the hypertext transfer protocol (HTTP), a markup language, a scripting language, and/or a transfer protocol.

7. The method of claim 6, wherein identifying the viewer includes enabling the browser to determine a plug-in that can present the OTDR information.

8. The method of claim 7, wherein the plug-in includes a computer-program product that adds functionality to a browser.

9. The method of claim 8, wherein communicating the OTDR information to the browser includes enabling the browser to render the OTDR information.

10. One or more computer-readable media having computer-useable instructions embodied thereon to perform the method of claim 9.

11. A method for providing Optical Time Domain Reflectometer (OTDR) trace information generated by an OTDR device, comprising:
    obtaining an OTDR trace file having a native format, wherein the OTDR trace file includes OTDR information; and
    storing the OTDR trace file in its native format on one or more computer-readable media for subsequent data retrieval, wherein said OTDR information can be presented in a web browser by identifying a viewer that can render the OTDR information in the web browser on a display device.

12. The method of claim 11, wherein the OTDR information includes data related to diagnosing communications problems associated with a communications link.

13. The method of claim 12, wherein the data includes information related to a fiber route, fiber span, and/or fiber cable.

14. The method of claim 11, wherein the native format includes a file format having at least one of the following extensions: .SOR, .PSF, .WFM, and .CFF.

15. One or more computer-readable media having computer-useable instructions embodied thereon for performing a method of presenting Optical Time Domain Reflectometer (OTDR) information, the method comprising:
    receiving an OTDR trace file, wherein the OTDR trace file contains fiber-route data generated from an OTDR device;
    embodying the OTDR trace file in its native format in one or more storage media;
    receiving a request to present in a browser the fiber-route data;
    identifying a file viewer that can render the fiber-route data from the native OTDR trace file; and
    using the file viewer and the OTDR trace file in its native format, presenting the one or more portions of the fiber-route data in the browser on a display device.

16. The media of claim 15, wherein the OTDR device is at least one of:
    a communications-equipment-testing device; and
    a problem-diagnosis device including a fiber-fault-location device.

17. The media of claim 15, wherein fiber-route data includes data related to one or more optical-fiber communications routes, spans, and/or cables.

18. The media of claim 17, wherein the data includes wavelength measurements.

19. The media of claim 18, wherein the file viewer is a computer-program product that adds functionality to the browser.

20. The media of claim 17, wherein the OTDR trace file native format is the format generated by the OTDR device.

21. The media of claim 20, wherein the format generated by the OTDR device includes one of the following file types: SOR, .PSF, .WFM, and .CFF.

22. A system for presenting Optical Time Domain Reflectometer (OTDR) information comprising:
    a user interface that facilitates uploading an OTDR trace file in its native format;
    a storage device coupled to the user interface for receiving the trace file;
    one or more tangible computer-readable media having computer-useable instructions embodied thereon for identifying one or more viewers based on retrieval of said OTDR trace file; and
    at least one of said identified one or more viewers coupled to the storage device, said viewer(s) useable in connection with said OTDR trace file for presenting data within the OTDR trace file via the browser on a display device.

23. The system of claim 22, wherein the user interface includes a plurality of screens to upload data, wherein the data is related to one or more selections from the following: routes, fibers, spans, power-measurement data fiber counts; analysis of splices, connectors and fiber attenuation; bidirectional measurement analysis data such as two-way-averaging and bending detection measurements; scan trace and pass/fail test data; multiple traces; refractive indices; backscatter coefficients; and/or resplicing and repair data.

24. The system of claim 23, wherein the user interface includes a first screen for navigating to a plurality of OTDR functions.

25. The system of claim 24, where the plurality of OTDR functions is at least one of:
    managing one or more communications routes;
    managing one or more communications spans;
    managing one or more communications cables;
    managing one or more power attributes; and
    managing one or more line splices.

26. The system of claim 23, wherein the OTDR trace file native format is a format generated by an OTDR device.

27. The media of claim 26, wherein the format generated by the OTDR device includes one of the following file types: .SOR, .PSF, .WFM, and .CFF.

28. A method for receiving Optical Time Domain Reflectometer (OTDR) data generated by an OTDR device, comprising:
    receiving a request to present the OTDR data from an OTDR file stored in its native format on one or more computer-readable media;
    identifying a viewer that can render in a web browser the OTDR information in the OTDR data; and
    using the viewer and the OTDR file in its native format, presenting the OTDR information via the browser on a display device.

29. The method of claim 28, wherein receiving a request to print the OTDR includes receiving a request to present the OTDR data in a browser.

30. The method of claim 29, wherein the viewer is a browser plug-in.

31. The method of claim 30, where the OTDR data is data related to one or more of the following: routes, fibers, spans, power-measurement data fiber counts; analysis of splices, connectors and fiber attenuation; bidirectional measurement analysis data such as two-way-averaging and bending detection measurements; scan trace and pass/fail test data; multiple traces; refractive indices; back-scatter coefficients; and/or resplicing and repair data.

* * * * *